Dec. 11, 1962 P. G. MAGNER, JR 3,067,804
METHOD OF AND APPARATUS FOR MAKING A COMPOSITE
CUSHIONING AND SEALING STRIP
Filed Jan. 10, 1958 3 Sheets-Sheet 1
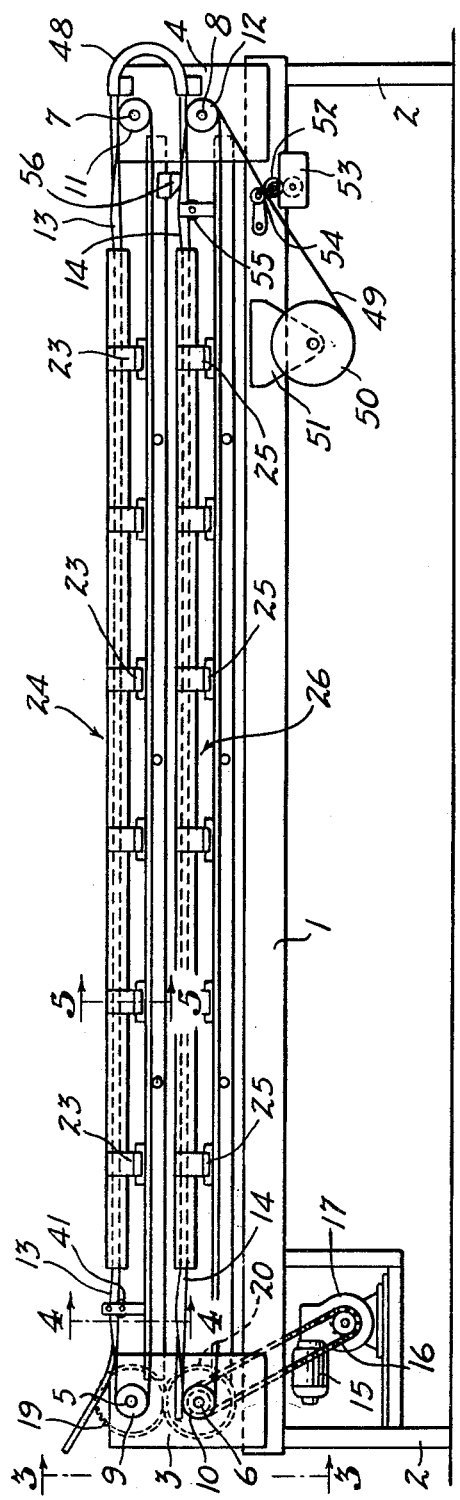
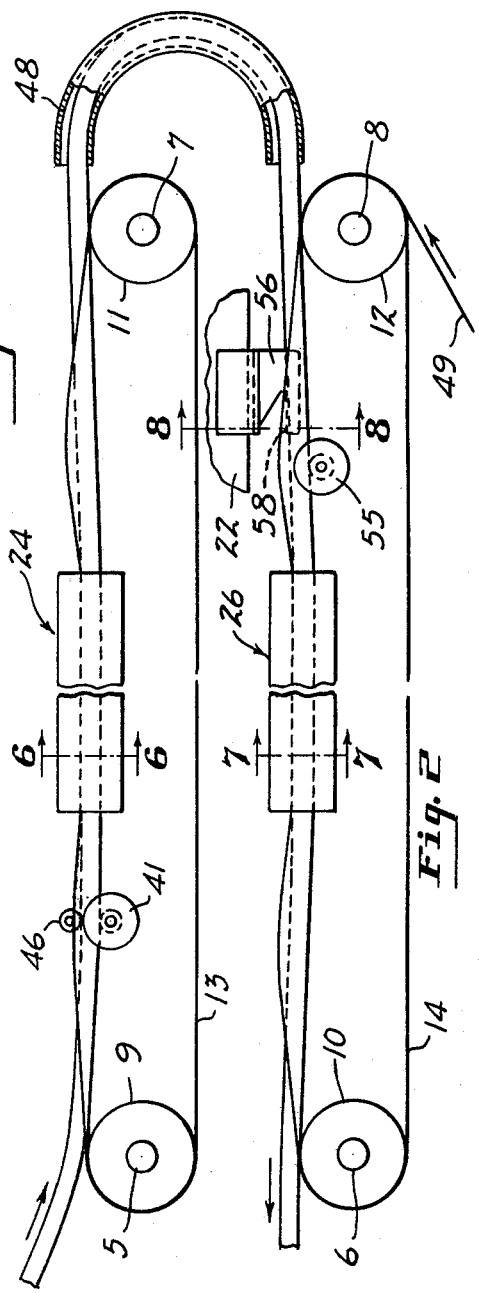
INVENTOR
*Philip G. Magner Jr.*
BY *McCoy, Greene + Le Grdenbris*
ATTORNEYS

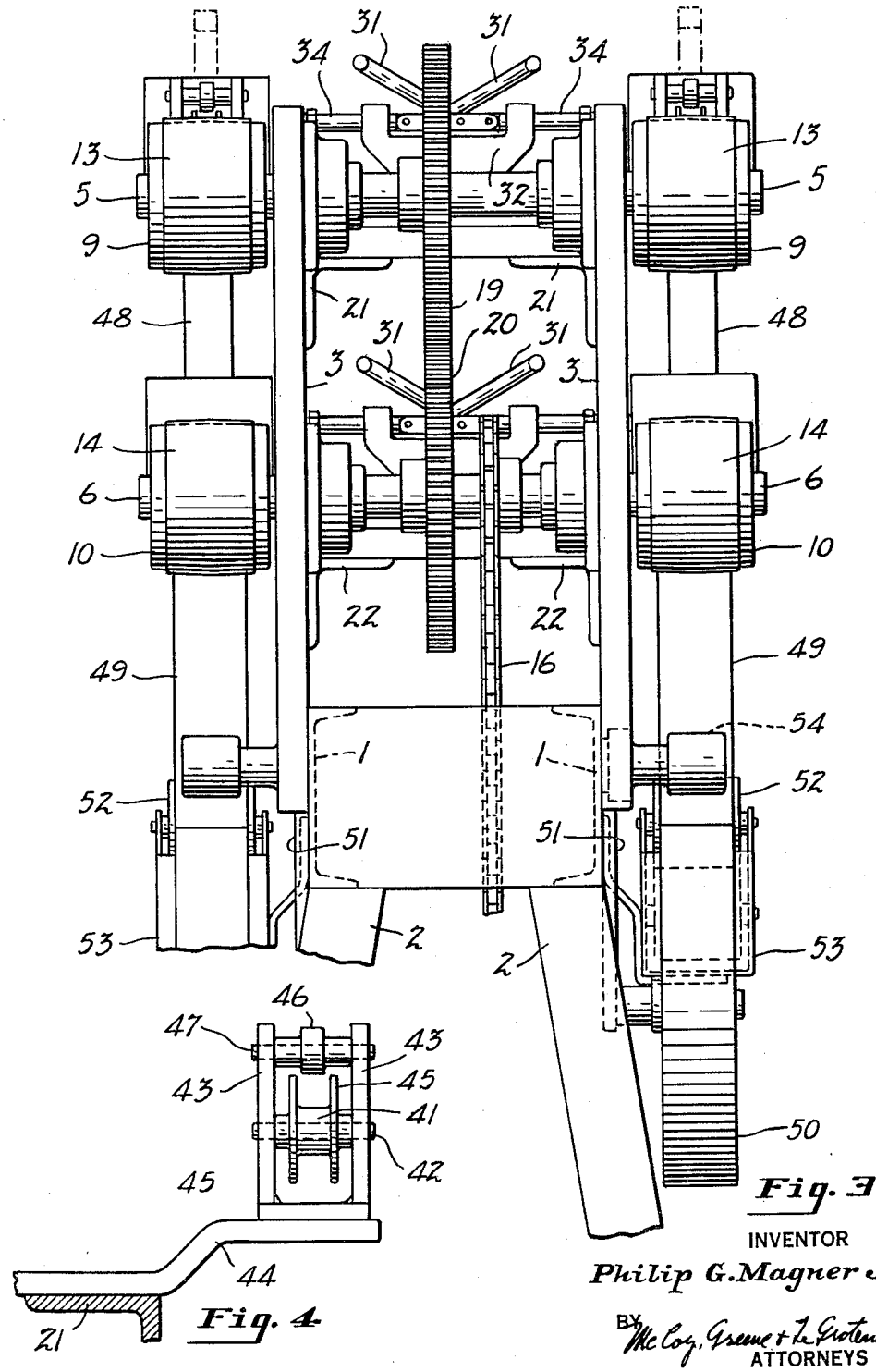

Dec. 11, 1962 P. G. MAGNER, JR 3,067,804
METHOD OF AND APPARATUS FOR MAKING A COMPOSITE
CUSHIONING AND SEALING STRIP
Filed Jan. 10, 1958 3 Sheets-Sheet 3
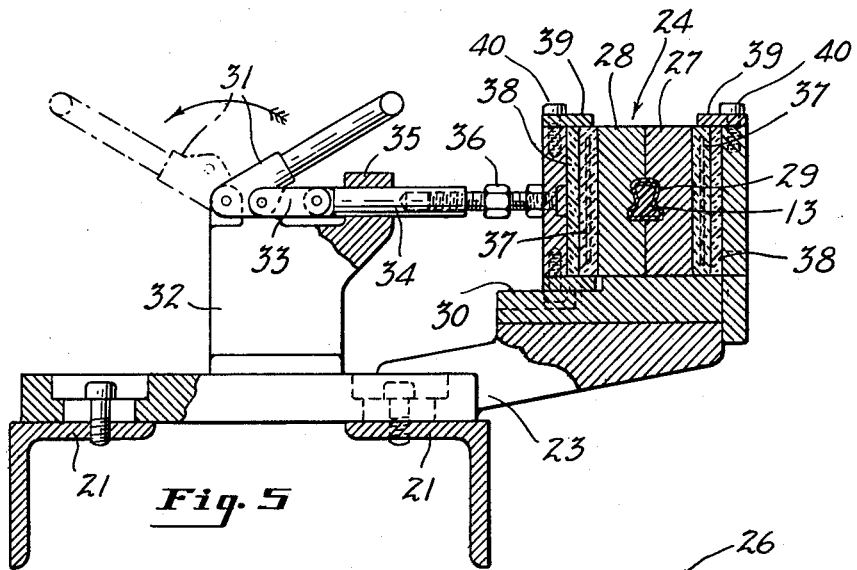
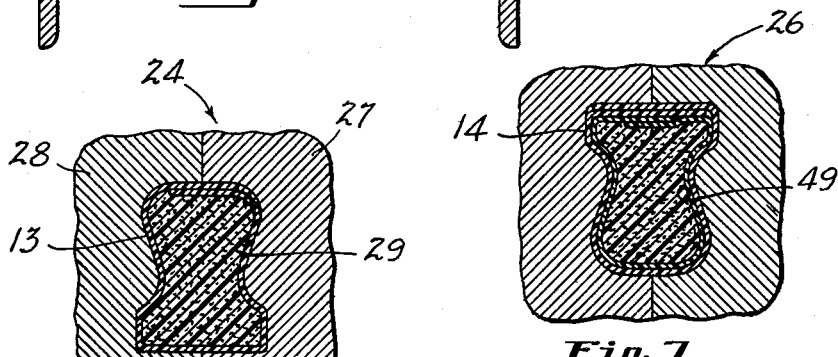
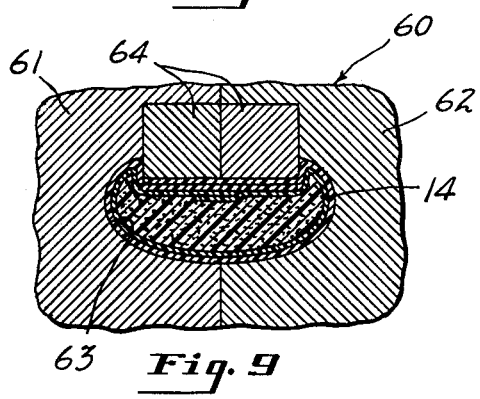
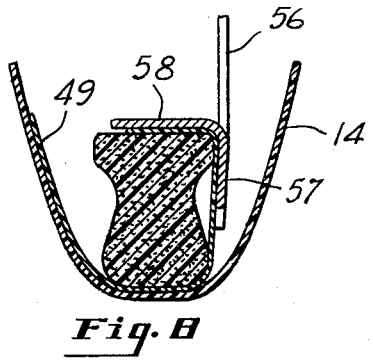
INVENTOR
*Philip G. Magner Jr.*
BY *McCoy, Greene + LeGrotenhuis*
ATTORNEYS United States Patent Office 3,067,804
Patented Dec. 11, 1962

3,067,804
METHOD OF AND APPARATUS FOR MAKING A COMPOSITE CUSHIONING AND SEALING STRIP
Philip G. Magner, Jr., Marion, Ind., assignor to The General Tire & Rubber Company, Akron, Ohio, a corporation of Ohio
Filed Jan. 10, 1958, Ser. No. 708,085
2 Claims. (Cl. 156—461)

This invention relates to the manufacture of cushioning and sealing strips that have a cushioning body of resilient foam that is enclosed in a water-proof envelope, and more particularly to a method and apparatus for shaping a continuous strip of foam and for applying the envelope thereto. The body of the strip is composed of a foam of a thermoplastic material such as polyurethane, polyvinyl chloride or polyvinylacetate that can be softened to a temperature below its fusing point and molded to a desired shape by pressure without destroying the cellular structure in the compressed portions and that will retain its resilience and its molded shape, and the present invention provides a method for shaping a continuous strip of foam and applying an envelope of thin, moldable sheet material thereto, and also to apparatus for performing the shaping and wrapping operations. The foam is preferably a polyurethane foam and the wrapper sheet is preferably a thermoplastic sheet material.

The cushioning foam body may be formed from a continuous strip which may be of uniform rectangular cross section cut from a sheet of the foam. This strip is fed to an endless flexible belt that passes through an elongated heated shaping die, the endless belt being folded laterally over the foam strip at the entrance end of the die and the belt and enclosed foam strip being forced to conform to the interior of the die passage.

The wrapper or envelope of thin, moldable sheet material which may be a thermoplastic material such as polyvinyl chloride or polyethylene or an uncured elastomer such as butyl rubber or neoprene, is in the form of a strip of a width greater than the perimeter of the foam strip. The foam strip is laid lengthwise on the strip of sheet material, the sheet material is wrapped laterally around the foam strip and the foam strip with its wrapper is passed through a heated shaping die that applies pressure to the sheet material and foam strip to cause the envelope to closely conform to the foam strip and to set both the foam strip and envelope to the shape of the die. The foam strip is preferably passed first with an endless belt through an elongated heated shaping die and then to a second endless belt which carries the shaped foam strip and the wrapper strip through a second elongated heated wrapper setting die. The carrying belt is driven in a direction to carry the foam strip and wrapper strip through the setting die and, as the strips pass with the belt to the die, the wrapper strip is wrapped laterally around the foam strip and the belt is wrapped laterally around the strip exteriorly of the wrapper.

Objects of the invention are to provide a continuous method of shaping and wrapping a foam strip to form a sealing strip of the desired sectional shape and to provide a machine capable of performing the required operations rapidly and efficiently.

Reference should be had to the accompanying drawings forming a part of this specification, in which:

FIGURE 1 is a side elevation of a machine embodying the invention;

FIG. 2 is a side elevation on an enlarged scale, the view being shortened by breaking away a portion of the shaping dies;

FIG. 3 is an end elevation of the machine viewed as indicated at 3—3 in FIG. 1;

FIG. 4 is a fragmentary transverse vertical section taken on the line indicated at 4—4 in FIG. 1, and showing the strip hold-down and belt turn-up rolls;

FIG. 5 is a transverse vertical section taken on the line indicated at 5—5 in FIG. 1, showing the die opening and closing means;

FIG. 6 is a transverse vertical section through the upper shaping die taken on the line indicated at 6—6 in FIG. 2;

FIG. 7 is a transverse vertical section through the lower shaping die taken on the line indicated at 7—7 in FIG. 2;

FIG. 8 is a transverse vertical section through the wrapper folding plate, taken on the line indicated at 8—8 in FIG. 2; and FIG. 9 is a sectional view showing a shaping and wrapper setting die having a different configuration.

Referring to the accompanying drawings, the machine of the present invention is carried by an elongated supporting frame provided with a pair of parallel inwardly facing longitudinal channel beams 1 connected together and provided with supporting legs 2 at their ends. A pair of vertical plates 3 are attached to the outer faces of the beams 1 at one end of the frame and extend upwardly therefrom. A similar pair of vertical plates 4 are attached to the opposite ends of the beams 1. Upper and lower horizontal shafts 5 and 6 are journaled in the plates 3 and similar superposed shafts 7 and 8 are journaled in the plates 4. The shaft 5 has identical pulleys 9 attached to its opposite ends exteriorly of the plates 3 and the shafts 6, 7 and 8 carry similar pairs of pulleys 10, 11 and 12. The pulleys 9 and 11 carry endless belts 13 and the pulleys 10 and 12 carry endless belts 14 that are disposed beneath the belts 13. The belts are driven by an electric motor 15 that has a driving connection with the shaft 6 through a sprocket chain 16 and suitable reduction gearing in a housing 17. The shafts 5 and 6 have intermeshing spur gears 19 and 20 attached thereto through which the shaft 5 is driven from the shaft 6 in a direction opposite to that in which the shaft 6 is driven, so that the top runs of the superposed belts 13 and 14 are caused to travel in opposite directions.

Upper and lower pairs of longitudinal angle bars 21 and 22 are connected at their ends to the inner faces of the plates 3 and 4. The upper bars 21 provide supports for brackets 23 which project laterally and provide supports for upper elongated shaping dies 24. The lower angle bars 22 carry similar brackets 25 that provide supports for lower shaping dies 26. Two superposed endless belts 13 and 14 are provided on each side of the supporting frame, the upper belts 13 passing through upper shaping dies 24 and the lower belts 14 passing through lower shaping dies 26. Two strip forming machines are thus provided on a single supporting frame, that are driven simultaneously by a single motor 27. The remainder of the description will refer to one of the forming mechanisms only, it being understood that the mechanisms are essentially the same except that different dies may be employed to produce a strip of one shape in one of the machines, while a strip of another shape is being produced in the other machine.

As best shown in FIG. 5, the die 24 has an outer fixed section 27 and an inner movable section 28, the sections 27 and 28 having meeting faces that are recessed to provide a longitudinal passage 29 having a cross-sectional shape corresponding to that to which the strip is to be formed. The inner section 28 is mounted to slide inwardly and outwardly on a bed plate 30 carried by the brackets 23 and is moved into and out of closed position by means of a lever 31 pivoted to a stand 32 on a bracket 23. The lever 31 is connected by a link 33 to the end of a rod 34 mounted to slide horizontally in a bearing 35 in the stand 32, the rod 35 being connected to the section 28 by a turnbuckle 36 so that the connection between the lever and die section may be adjusted to insure snug engagement between the die sections. Each of the die sections 27 and 28 is provided with an electrical heating element 37 and with insulating plates 38 covering the outer faces of the heating elements. The heating elements and insulating plates are held in place by clamping strips 39 which are held in place in the mold sections 27 and 28 by bolts 40.

As shown in FIGS. 1 and 2 of the drawings, the belt 13 is driven in a direction to carry the foam strip into the left-hand end of the upper die 24. Adjacent the entrance end of the die 24 there is provided a belt turnup roller 41 which, as best shown in FIG. 4, is carried by a shaft 42 journaled in posts 43 carried by a bracket 44 attached to an upper angle bar 21. The roller 41 has belt turnup flanges 45 which serve to deflect the side edge portions of the belt upwardly against opposite sides of a foam strip supported on the belt, the foam strip being held down against the belt and against the roller 41 by means of a holddown roller 46 carried by a shaft 47 journaled in the post 43. In passing from the roller 41 to the entrance end of the die 24, the edges of the belt 13 are folded inwardly over the top of the foam strip as shown in FIG. 6 of the drawings. The passage 29 in the die may be tapered at the entrance end to allow the belt and foam strip to be gradually drawn into conformity to the die passageway.

At the delivery end of the belt 13 the formed foam strip is delivered from the belt 13 into an arcuate guide member 48 which guides the strip downwardly onto the receiving end of the lower belt 14. A strip of thin, flexible, moldable sheet material 49 is delivered from a reel 50 carried by a bracket 51 attached to the beams 1 to the portion of the belt 14 passing over the pulley 12, passing over an applicator roller 52 that applies a coating of adhesive from a container 53 to the under face of the strip 49, the strip 49 being held against the roller 52 by means of a holddown roller 54. The adhesive coated strip 49 passes over the end 12 and onto the upper run of the belt 14 with its adhesive coated face lying beneath the strip of foam material passing from the die 48 onto the belt 14.

A flanged turn-up roller 55 similar to the turn-up roller 41 is provided adjacent the entrance end of the lower shaping die 26, which may be identical with the die 24 except that a slight difference in the size and shape of the die passage may be desirable. Adjacent the turn-up roller 55 there is provided a combined hold-down and wrapper guide plate 56 attached to the lower frame bar 22. As best shown in FIG. 8, the plate 56 has a face portion 57 alongside the foam strip and a triangular hold-down and wrapper folding flange 58 that is struck up from the body of the plate 56. An edge portion of the strip 49 engages the portion 57 of the plates 56 and is guided into engagement with the inclined edge of the folding flange 58 which guides the edge of the strip into engagement with the top of the foam strip as shown in FIG. 8 before the belt 14 is folded over the foam strip at the entrance end of the die 26. The belt 14 is thus caused to be folded over the foam strip exteriorly of the wrapper strip 49 and the longitudinal edges of the wrapper strip are overlapped against the longitudinal top face of the foam strip, as is shown in FIG. 7. In passing through the die 26 the thermoplastic wrapper strip is pressed into conformity with the foam strip so that its adhesive coated face is adhered to the foam strip. The moldable wrapper sheet, which may be a polyvinyl or polyethylene plastic or a vulcanizable elastomer, is molded and set to a shape corresponding to that of the foam strip which it encloses during passage through the heated die 26.

In FIG. 9 of the drawings, a modified die 60 is shown which is shaped to provide a sealing strip of cross-sectional form somewhat different from that shown in FIGS. 6, 7 and 8. The modified die 60 has inner and outer sections 61 and 62 which may be similar to the sections 24 and 28 and meeting faces of the die sections are provided with cavities 63 which provide a passage of the cross section to which the cushioning strip is to be formed. In order to shape reentrant portions of the strip, removable inserts 64 may be provided in the sections 61 and 62.

It is to be understood that in accordance with the provisions of the patent statutes, variations and modifications of the specific devices herein shown and described may be made without departing from the spirit of the invention.

What I claim is:

1. Apparatus for making a sealing strip comprising an elongated heated shaping die, means for feeding a foam strip to and through said die comprising an endless flexible belt of a width greater than the perimeter of said foam strip and passing through said die, means for driving said belt and for folding the same around said strip at the entrance end of said die, a second elongated heated shaping die, a second endless flexible belt passing through said second die, means for feeding a strip of thin flexible thermoplastic sheet material of a width greater than the perimeter of the shaped strip onto said second belt, means for delivering said shaped strip to said second belt and for laying it lengthwise on said strip of sheet material, means for driving said second belt in a direction to carry said strips through said second die, and means for folding said strip of sheet material laterally around said shaped strip and for overlapping the longitudinal edges thereof against a longitudinal face of said foam strip as the strips pass into said second die.

2. Apparatus for making a sealing strip comprising an elongated heated shaping die, means for feeding a foam strip to and through said die comprising an endless flexible belt of a width greater than the perimeter of said foam strip and passing through said die, means for driving said belt and for folding the same around said strip at the entrance end of said die, a second elongated heated shaping die, a second endless flexible belt passing through said second die, means for applying a coating of adhesive to a strip of thin flexible thermoplastic sheet material of a width greater than the perimeter of said shaped strip and for feeding the same adhesive side up onto said second belt, means for delivering said shaped strip to said second belt and for laying it lengthwise on the adhesive coated face of said strip of sheet material, means for driving said second belt in a direction to carry said strips through said second die, and means for folding said strip of sheet material laterally around said shaped strip and overlapping its longitudinal edges against a longitudinal face of said foam strip and for folding said second belt laterally around the shaped strip exteriorly of said strip of sheet material as the strips and belt pass into said second die.

References Cited in the file of this patent

UNITED STATES PATENTS

| | | |
|---|---|---|
| 1,113,513 | Tyler et al. | Oct. 13, 1914 |
| 2,141,405 | Randall | Dec. 27, 1938 |
| 2,319,042 | De Wyk | May 11, 1943 |
| 2,698,272 | Clapp et al. | Dec. 28, 1954 |
| 2,796,810 | Muller | June 25, 1957 |
| 2,912,043 | Bargholtz et al. | Nov. 10, 1959 |